United States Patent
Quek et al.

(10) Patent No.: US 8,617,762 B2
(45) Date of Patent: Dec. 31, 2013

(54) METHOD OF PROCESSING A CERAMIC ELECTROLYTE, AND RELATED ARTICLES

(75) Inventors: Shu Ching Quek, Clifton Park, NY (US); Chandra Sekher Yerramalli, Niskayuna, NY (US); Todd-Michael Striker, Guilderland, NY (US); Badri Narayan Ramamurthi, Clifton Park, NY (US); Sylvia Marie DeCarr, Schenectady, NY (US); Venkat Subramaniam Venkataramani, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1827 days.

(21) Appl. No.: 11/863,747

(22) Filed: Sep. 28, 2007

(65) Prior Publication Data

US 2012/0178015 A1    Jul. 12, 2012

(51) Int. Cl.
*H01M 8/10* (2006.01)
(52) U.S. Cl.
USPC ............ 429/482; 427/115; 427/446; 427/596
(58) Field of Classification Search
USPC .......................................................... 429/43
See application file for complete search history.

(56) References Cited

U.S. PATENT DOCUMENTS

| | | | |
|---|---|---|---|
| 5,358,735 A | 10/1994 | Kawasaki et al. | |
| 6,692,855 B1 * | 2/2004 | Aizawa et al. | 429/479 |
| 2002/0155227 A1 | 10/2002 | Damani et al. | |

FOREIGN PATENT DOCUMENTS

| | | |
|---|---|---|
| EP | 0513982 B1 | 7/1995 |
| JP | 05135787 A | 6/1993 |
| JP | 11329463 A | 11/1999 |
| JP | 2003051322 A | 2/2003 |

* cited by examiner

*Primary Examiner* — Barbara Gilliam
*Assistant Examiner* — Gary Harris
(74) *Attorney, Agent, or Firm* — Francis T. Coppa

(57) ABSTRACT

A method of processing a ceramic electrolyte suitable for use in a fuel cell is provided. The method comprises situating a ceramic electrolyte layer over an anode layer; and subjecting the ceramic electrolyte layer to a stress prior to operation of the fuel cell, by: exposing the top surface of the electrolyte layer to an oxidizing atmosphere and the bottom surface of the electrolyte layer to a reducing atmosphere; and heating the electrolyte layer. The stress causes a substantial increase in the number of microcracks, or in the average size of the microcracks, or in both the number of the microcracks and their average size. A solid oxide fuel cell comprising a ceramic electrolyte layer processed by the disclosed method is also provided.

26 Claims, 6 Drawing Sheets

METHOD OF PROCESSING A CERAMIC ELECTROLYTE, AND RELATED ARTICLES

BACKGROUND OF THE INVENTION

The invention is related to a method of processing a ceramic electrolyte. The invention is also related to devices made therefrom.

Solid oxide fuel cells (SOFCs) are promising devices for producing electrical energy from fuel with high efficiency and low emissions. One barrier to the widespread commercial use of SOFCs is the high manufacturing cost. The manufacturing cost is largely driven by the need for state-of-the-art ceramic anodes, cathodes, or electrolytes, which allow the fuel cells to operate at high temperatures (e.g., about 800° C.). Fuel cell components that can meet these criteria require materials of construction that can be expensive to manufacture. Solid oxide fuel cells need to have high power densities and fuel utilizations, and need to be large in size, in order to make the technology economically feasible.

Thermal spray processes, such as air plasma spray, have the potential to provide large-area cells on interconnect supports that may reduce manufacturing costs. However, air-plasma-sprayed coatings typically contain both porosity and microcracks, which in the case of a ceramic electrolyte may provide leak paths for the fuel and air. Microcracks are typically formed at interlamellar splat boundaries during deposition, or are formed through the thickness of the coating, due to large thermal expansion strains caused during deposition. Such defects may limit the open cell voltage and fuel utilization. Therefore, there is a continuous need to improve the performance of a ceramic electrolyte and versatile methods to process ceramic electrolytes.

BRIEF DESCRIPTION OF THE INVENTION

The present invention meets these and other needs by providing a method to process a ceramic electrolyte that facilitates substantial reduction in permeability.

In one embodiment, the invention provides a method of processing a ceramic electrolyte, suitable for use in a fuel cell. The method comprises situating a ceramic electrolyte layer over an anode layer; subjecting the ceramic electrolyte layer to a stress, prior to operation of the fuel cell, by: exposing the top surface of the electrolyte layer to an oxidizing atmosphere and the bottom surface of the electrolyte layer to a reducing atmosphere; and heating the electrolyte layer. The stress causes a substantial increase in the number of microcracks, or in the average size of the microcracks, or in both the number of the microcracks and their average size. The electrolyte layer comprises a top surface, a bottom surface, and a number of microcracks extending at least partially between the two surfaces. The bottom surface of the electrolyte layer is adjacent to the anode layer.

Another embodiment is a solid oxide fuel cell. The solid oxide fuel cell comprises an anode; a cathode; and a ceramic electrolyte disposed between the anode and the cathode. The ceramic electrolyte is formed by the method recited above, and further described in the remainder of the specification.

These and other features, aspects, and advantages of the present invention will become better understood when the following detailed description is read with reference to the accompanying drawings in which like characters represent like parts throughout the drawing.

DETAILED DESCRIPTION OF THE INVENTION

Figure 1:
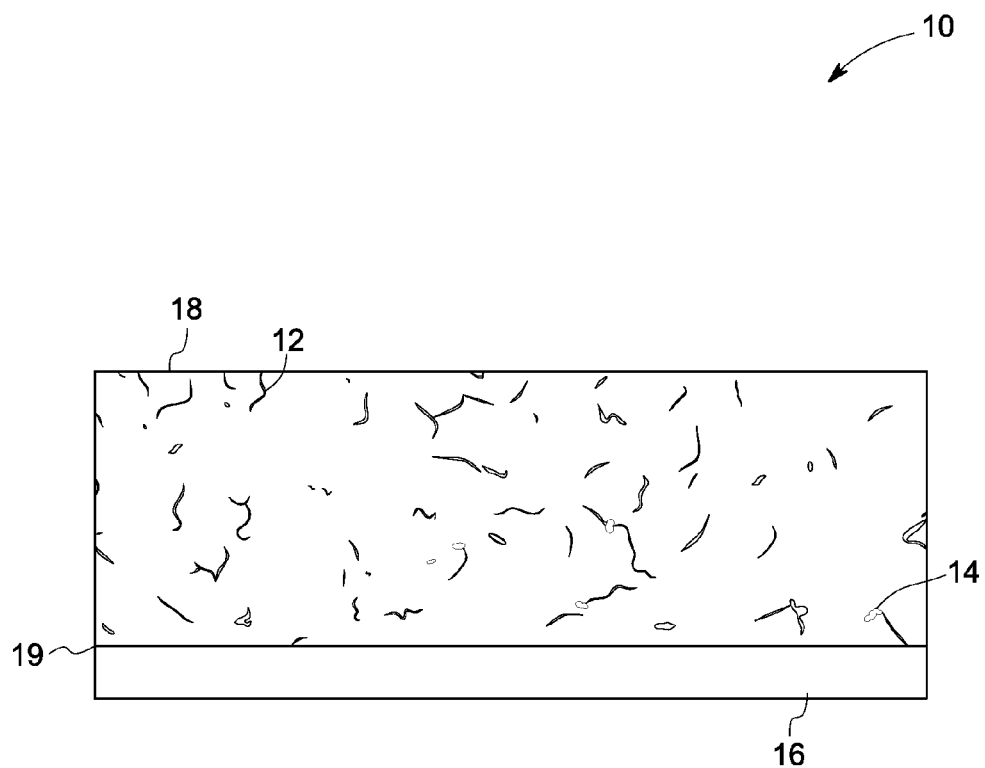
FIG. 1 is a schematic representation of a ceramic layer comprising a plurality of microcracks and pores.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Typically, ceramic layers deposited by conventional deposition methods comprise many pores and microcracks. FIG. 1 shows a schematic representation of one such ceramic layer 10 containing microcracks 12 and pores 14, deposited over an anode layer 16. Such microcracks or pores present in ceramic layers may significantly affect their performance, especially when used as a ceramic electrolyte in a solid oxide fuel cell. Many of the methods developed so far to decrease the porosity of the ceramic electrolyte layers, (increasing their density), and hence, to improve their performance, involve infiltration and heat processing steps. However, under such conditions, when the processed ceramic electrolytes are exposed to high operating temperatures, additional microcracks may form and hence with continuous operation, the efficiency of the device may degrade drastically. The present inventors have developed a versatile method to fabricate a ceramic electrolytes having substantially reduced permeability, using a unique approach of pre-initiating any cracks or porosity that the ceramic electrolyte may experience upon subsequent heating, prior to densifying the ceramic layer by metal ion infiltration and oxidation. The details of the process are described in the subsequent embodiments.

Figure 2:
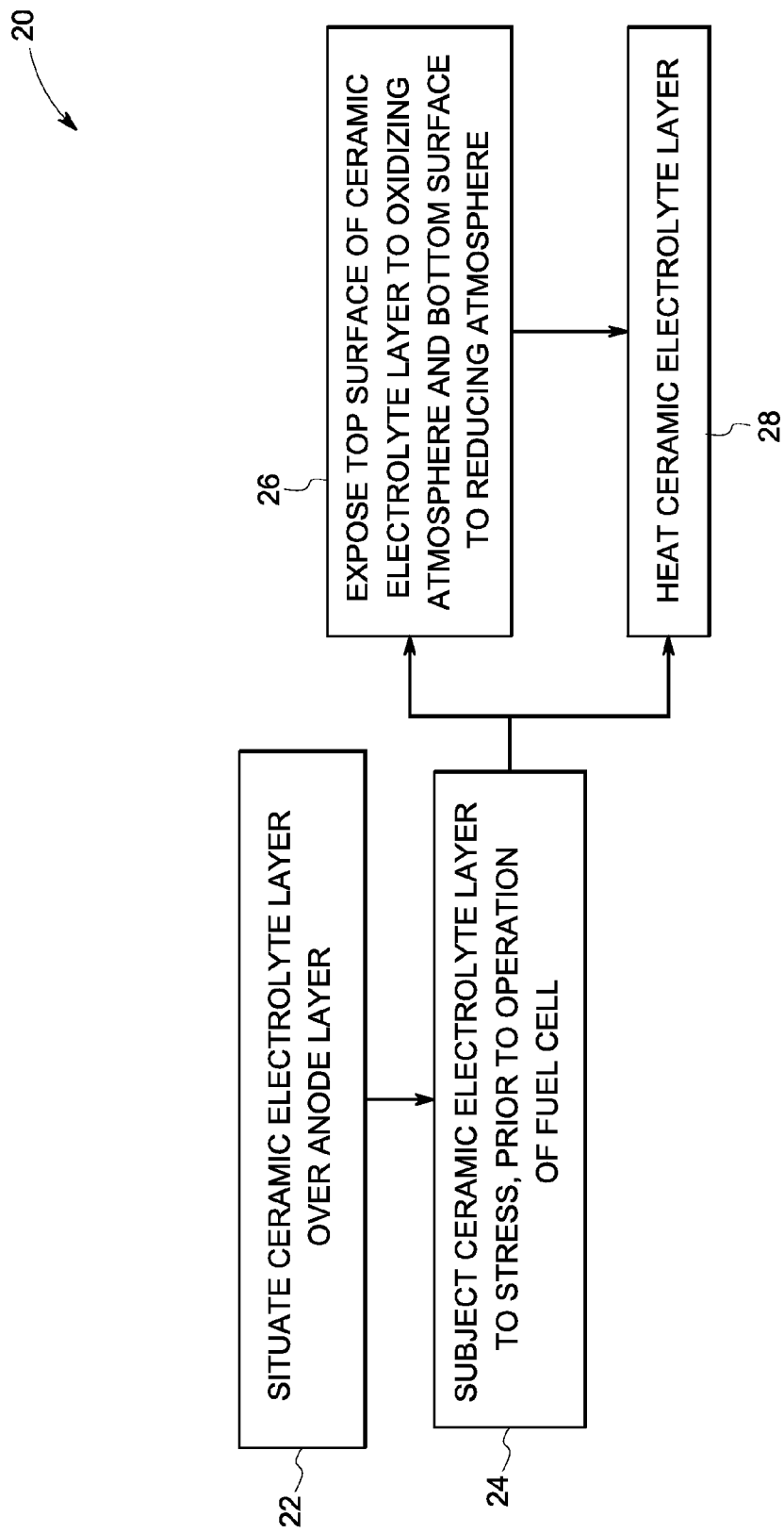
FIG. 2 is a flow chart of a method, according to one embodiment of the invention, for preparing a composite ceramic electrolyte.

In one embodiment of the invention, a method of processing a ceramic electrolyte layer 10, suitable for use in a fuel cell, is provided. FIG. 2 shows a flow chart of a method 20 of processing a ceramic electrolyte layer 10. The method 20 comprises the steps of: situating a ceramic electrolyte layer 10 over an anode layer 16 in step 22; and subjecting the ceramic electrolyte layer 10 to a stress, prior to operation of the fuel cell, in step 24. FIG. 1 shows a ceramic electrolyte layer 10 comprising a top surface 18 and a bottom surface 19 situated over an anode layer 16 such that the bottom surface 19 of the electrolyte layer is adjacent to the anode layer 16. Typically, the ceramic electrolyte layer 10 comprises a number of microcracks 12 extending at least partially between the two surfaces (bottom and top), typical of ceramic layers deposited by known deposition techniques.

In one embodiment, situating the ceramic electrolyte layer 10 over the anode layer 16, in step 22, comprises depositing the ceramic electrolyte layer 10 over the anode layer 16. The electrolyte layer 10 is deposited such that the bottom surface 19 of the ceramic electrolyte layer 10 is adjacent to the anode layer 16. The ceramic electrolyte layer 10 may be deposited by any known process in the art. Some examples of suitable deposition processes include, but are not limited to, thermal spray, physical vapor deposition, electron beam physical vapor deposition, chemical vapor deposition, tape casting, screen-printing, and sol gel coating. Some examples of suitable thermal spray processes include, but are not limited to, air plasma spraying (APS), flame spraying, vacuum plasma spray, low pressure plasma spray and detonation coating. Alternatively, the ceramic electrolyte layer may be deposited from a vapor phase such as physical vapor deposition (PVD), electron beam physical vapor deposition (EBPVD), or chemical vapor deposition (CVD). The ceramic layer may also be prepared by the tape casting or screen-printing of a slurry, followed by subsequent sintering. Layers manufactured with such processes often contain capillary spaces which are formed by pores and open microcrack structures, and which impair an intended function of the layer. Air plasma spray coatings are formed by heating a gas- propelled spray of a powdered metal oxide or a non-oxide material with a plasma spray torch. The spray is heated to a temperature at which the powder particles become molten. The spray of the molten particles is directed against a substrate surface, where they solidify upon impact to create the coating. The conventional as-deposited APS microstructure is typically characterized by a plurality of overlapping splats of material, wherein the inter-splat boundaries may be tightly joined, or may be separated by gaps resulting in some pores and microcracks. The ceramic electrolyte layer 10 may be applied by an APS process using equipment and processes known in the art. Those skilled in the art understand that the process parameters may be modified, depending on various factors, such as the composition of the electrolyte material, and the desired microstructure and thickness. Typically, the as- deposited ceramic layer 10 is characterized by a gas permeability, measured in air, of less than about $8 \times 10^{-10}$ $cm^2 Pa^{-1} sec^{-1}$. Typically, as deposited ceramic layers have an average crack width of about 100 nanometers and an average microcrack width of about 1000 nanometers; a linear crack density of around 70 $\mu m^{-1}$; and a porosity of about 8%.

The process of subjecting the ceramic electrolyte layer 10 to a stress in step 24, prior to operation of the fuel cell, pre-initiates any microcracks or porosity which would typically occur in the layer during subsequent (actual) operation of the fuel cell. The stress causes a substantial increase in the number of microcracks, or in the average size of the microcracks, or in both the number of the microcracks and their average size. The ceramic electrolyte layer may be subjected to a stress by any suitable means. In a particular embodiment, the step of subjecting the ceramic electrolyte layer 10 to a stress in step 24, comprises: exposing the top surface 18 of the ceramic electrolyte layer 10 to an oxidizing atmosphere and the bottom surface 19 of the ceramic electrolyte layer 10 to a reducing atmosphere (step 26); and heating the ceramic electrolyte layer 10, in step 28.

Figure 3:
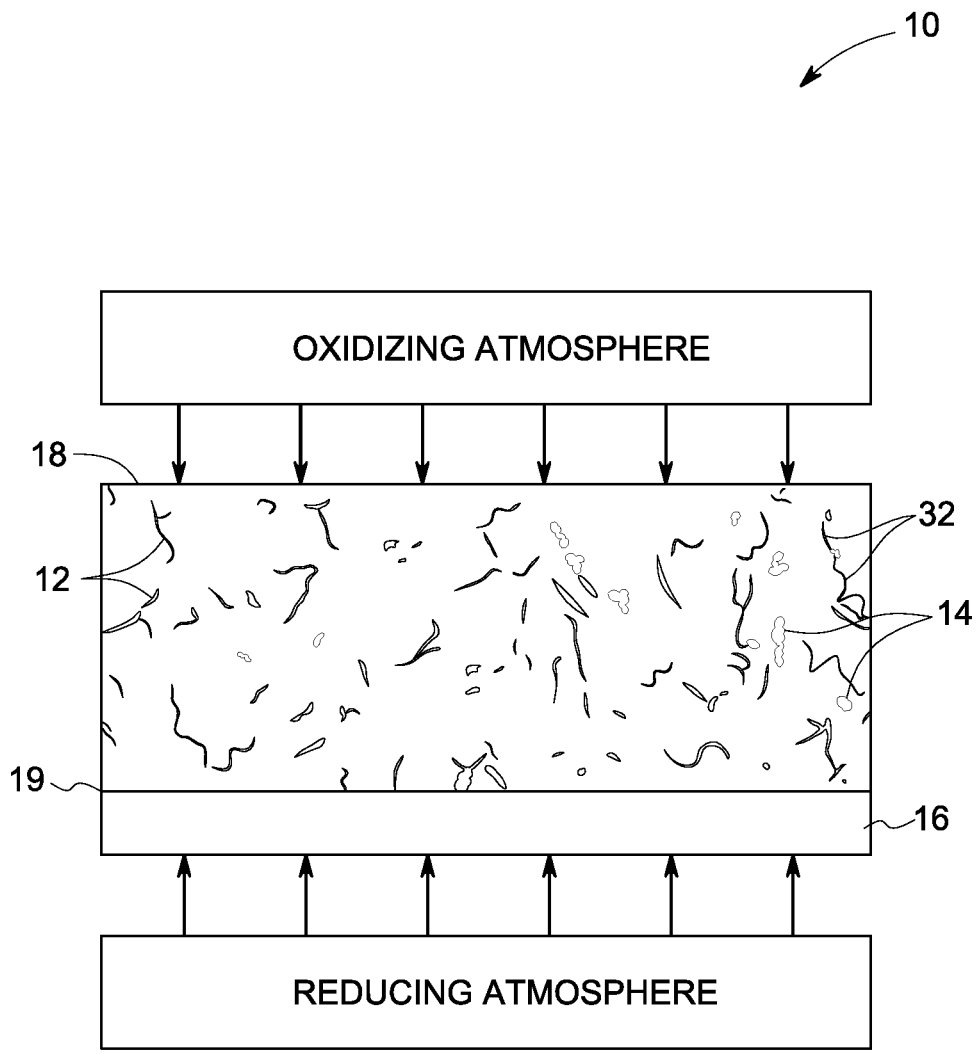
FIG. 3 is a schematic representation of a ceramic layer comprising a plurality of microcracks and pores on subjecting to a stress.

FIG. 3 schematically represents a ceramic electrolyte layer 10 situated over the anode layer 16 subjected to a stress. When the ceramic electrolyte layer 10 situated over the anode layer 16 is subjected to a reducing/oxidizing atmosphere (as described above) and heated to a high temperature, the thermal mismatch between the layers 10 and 16 causes a certain thermal stress to build up within the ceramic electrolyte layer 10. Simultaneously, the anode layer 16 is also reduced. Thus, an additional stress is exerted on the electrolyte layer 10, i.e., in addition to the thermal mismatch stresses. The additional stresses may cause additional microcracks 32 to initiate, and possibly create more porosity or leak paths. Moreover, the average size of the already existing microcracks 12 may also increase substantially in order to relieve the stresses created within the electrolyte layer 10.

The extent of increase in microcrack number or average size may depend on the amount of stress accumulated during deposition, thickness of the layer, composition of the anode layer, the thermal treatment conditions, and reducing gas content in the mixture on the anode side, among other parameters. Thus any of these parameters may be adjusted, in order to achieve the desired increase in microcrack density or dimensions. Typically, it may be desirable that the thermal treatment of the ceramic electrolyte layer during this pre-treatment is similar to the thermal conditions the ceramic electrolyte is exposed to during the actual device operation. In one embodiment, the ceramic electrolyte layer is heated for the pre-initiation of cracks in a temperature range from about 650° C. to about 1000° C. In another embodiment, the ceramic electrolyte layer is heated in a temperature range from about 750° C. to about 900° C. In still another embodiment, the ceramic electrolyte layer is heated in a temperature range from about 800° C. to about 850° C.

In one embodiment, the substantial increase in the number of microcracks on subjecting the ceramic electrolyte layer to stress comprises an increase in the linear crack density by at least about 1%. In another embodiment, the substantial increase in the average size of the microcracks comprises increase in the linear crack density of at least about 5%. In yet another embodiment, the substantial increase in the average size of the microcracks comprises increase in the linear crack density of at least about 30%. In one embodiment, the increase in the number of microcracks results in an increase of at least about 5% in permeability, as measured in air. The corresponding increase in porosity is by at least about 1%. In another embodiment, the increase in the number of microcracks results in an increase of at least about 20% in permeability, as measured in air. The corresponding increase in porosity is by at least about 5%. In another embodiment, the increase in the number of microcracks results in an increase of at least about 300% in permeability, as measured in air. The corresponding increase in porosity is by at least about 30%.

Figure 4:
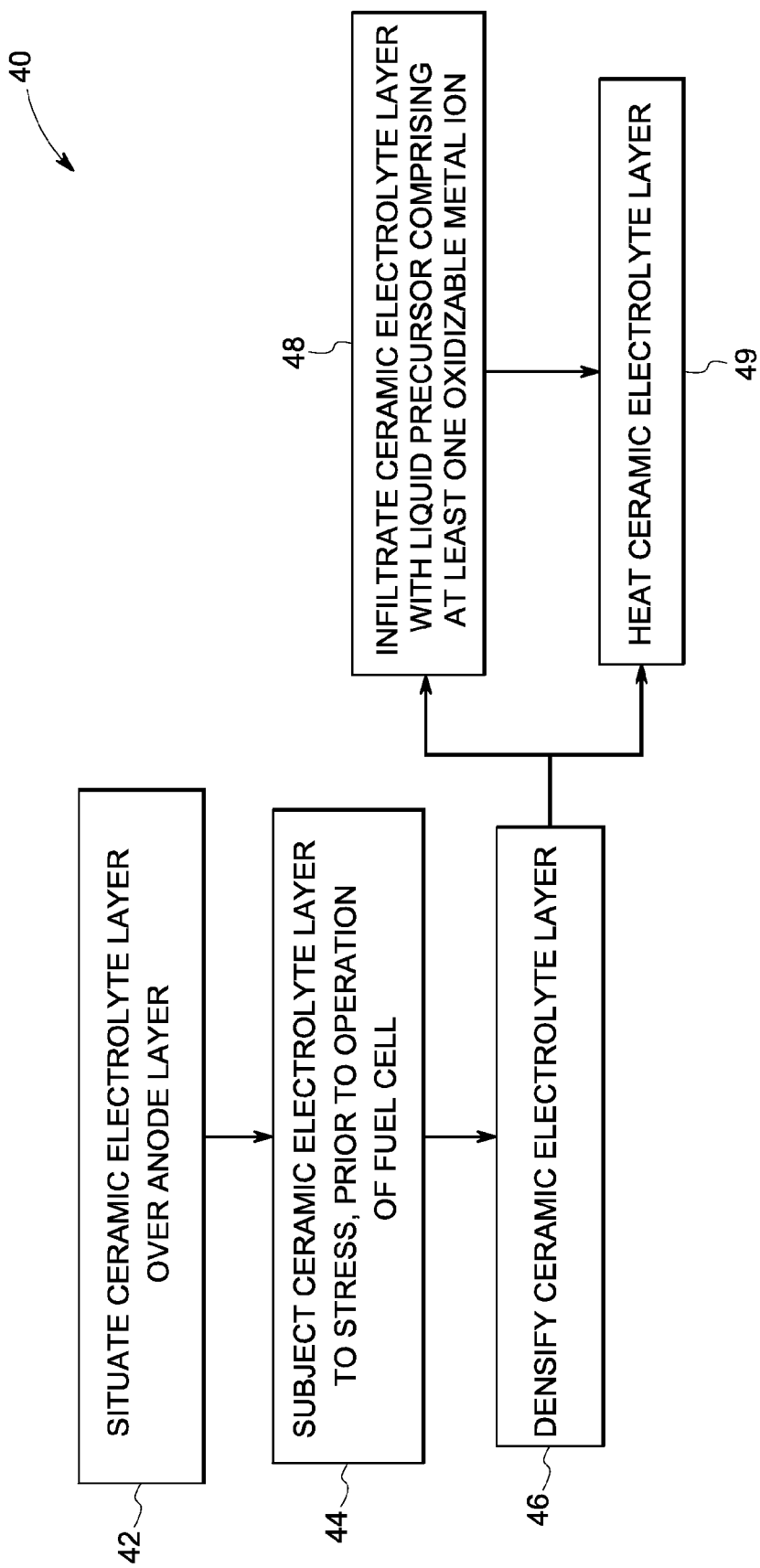
FIG. 4 is a flow chart of a method, according to one embodiment of the invention, for preparing a composite ceramic electrolyte.

In one embodiment, subjecting the ceramic electrolyte layer 10 to a stress comprises heating the electrolyte layer 10 situated over the anode layer 16 in a nitrogen atmosphere or an inert atmosphere or a reducing atmosphere or a mixture thereof. In one embodiment where a nitrogen atmosphere is used, the nitrogen atmosphere may comprise a nitrogen content in a range from about 1 volume percent to about 100 volume percent. In another embodiment where a nitrogen atmosphere is used, the nitrogen atmosphere may comprise a nitrogen content in a range from about 5 volume percent to about 100 volume percent. In one embodiment where the reducing atmosphere is used, the reducing atmosphere may comprise hydrogen content in a range from about 1 volume percent to about 100 volume percent. In another embodiment, the reducing atmosphere may comprise hydrogen content in a range from about 5 volume percent to about 100 volume percent. The amount of stress exerted on the ceramic electrolyte may be changed by changing the thermal treatment and the composition of the reduction/hydrogen atmosphere. FIG. 4 shows a flow chart of a method 40 of processing a ceramic electrolyte layer. As shown in FIG. 4, method 40 comprises the additional step of densifying the ceramic electrolyte layer (step 46) subsequent to the step of pre-initiation of microcracks by subjecting the ceramic electrolyte layer 10 (FIG. 1) situated over an anode layer (in step 42) to a stress (in step 44). (See, as well, the flow chart in FIG. 2, and the schematic in FIG. 3). The process of densification may typically involve the steps of infiltrating the ceramic electrolyte layer 10 with a liquid precursor comprising at least one oxidizable metal ion, so as to obtain an infiltrated ceramic electrolyte layer, in step 48, followed by a heating step, in step 49.

In step 48, at least some of the microcracks are infiltrated with a liquid precursor comprising at least one oxidizable metal ion. In certain embodiments, the liquid precursor is employed in the form of a solution. The solution may comprise any solvent, and a soluble salt material that allows formation of the solution. Some examples of suitable precursors include, but are not limited to, a halide, a nitrate, an alcoholate, an acetate, a citrate, a ketonate, an isopropoxide, an alkoxy carboxylate, an acrylate, an amide, an azide, and an imide. In a particular embodiment, the liquid precursor comprises an aqueous nitrate solution.

The metals are usually present in the form of cations. The oxidizable ion chosen may depend on the composition of the ceramic layer. Some examples of oxidizable ions include, but are not limited to, Zr, Ce, Y, Sc, Gd, Sm, Eu, Pr, Ba, Fe, Al, Co, La, Mn, Ga, Mg, Ca, Sr, Ti, Hf, and Bi. The corresponding anions are inorganic compounds, for example nitrate $NO_3^-$, or organic compounds, for example alcoholates or acetates. If alcoholates are used, then chelate ligands, such as acetyl acetonate, may be advantageously added to decrease the hydrolysis sensitivity of the alcoholates. Examples of suitable solvents are toluene, acetone, ethanol, isopropanol, ethylene glycol, and water. Aqueous and alcohol solutions of nitrates, and organic-metallic soluble materials, such as oxalates, acetates, and citrates, may also be used. The solution desirably has suitable wettability and solubility properties to permit infiltration into the pores and microcracks. Alternatively, molten precursor materials may also be utilized to infiltrate the microcracks. For example, molten nitrates may be used.

In step 49, the oxidizable metal ion is thermally converted into a metal oxide, by heating the infiltrated ceramic electrolyte layer to a suitably high temperature, and thereby, significantly reducing the average size of a selected number of microcracks. In one embodiment, the infiltrated ceramic electrolyte layer is heated at a temperature in the range from about 250° C. to about 800° C. In another embodiment, the infiltrated ceramic electrolyte layer is heated at a temperature in the range from about 300° C. to about 500° C. The actual temperature to which the infiltrated layer is exposed may, in part, depend on the infiltrated metal ion, and the composition of the electrolyte layer. The step of densification of the ceramic electrolyte layer decreases the porosity and hence, decreases the permeability of the ceramic layer.

The composition of the ceramic electrolyte, in part, depends on the end-use application. When the ceramic electrolyte is used in a solid oxide fuel cell, or in an oxygen or synthesis gas generator, the electrolyte may be composed of a material capable of conducting ionic species (such as oxygen ions or hydrogen ions), yet may have low electronic conductivity. When the ceramic electrolyte is used in a gas separation device, the ceramic electrolyte may be composed of a mixed ionic electronic conducting material. In all the above embodiments, the electrolyte may be desirably gas-tight to electrochemical reactants.

In general, for solid oxide fuel cell applications, the ceramic electrolyte has an ionic conductivity of at least about $10^{-3}$ S/cm, at the operating temperature of the device, and also has sufficiently low electronic conductivity. Examples of suitable ceramic materials include, but are not limited to, various forms of zirconia, ceria, hafnia, bismuth oxide, lanthanum gallate, thoria, and various combinations of these ceramics. In certain embodiments, the ceramic electrolyte comprises a material selected from the group consisting of yttria-stabilized zirconia, rare-earth-oxide-stabilized zirconia, scandia-stabilized zirconia, rare-earth doped ceria, alkaline-earth doped ceria, rare-earth oxide stabilized bismuth oxide, and various combinations of these compounds. In an exemplary embodiment, the ceramic electrolyte comprises yttria-stabilized zirconia. Doped zirconia is attractive because it exhibits substantially pure ionic conductivity over a wide range of oxygen partial pressure levels. In one embodiment, the ceramic electrolyte comprises a thermally sprayed yttria-stabilized zirconia. One skilled in the art would know how to choose an appropriate electrolyte, based on the requirements discussed herein.

In the case of an electrolytic oxygen separation device, oxygen is driven across the membrane by applying a potential difference and supplying energy. In such embodiments, the ceramic electrolyte may be chosen from electrolytes well-known in the art, such as yttria-stabilized zirconia (e.g., $(ZrO_2)_{0.92}(Y_2O_3)_{0.08}$, YSZ), scandia-stabilized zirconia (SSZ), doped ceria such as $(CeO_2)_{0.8}(Gd_2O_3)_{0.2}$ (CGO), doped lanthanum gallate such as $La_{0.8}Sr_{0.2}Ga_{0.85}Mg_{0.15}O_{2.285}$ (LSGM20-15), and doped bismuth oxide such as $(Bi_2O_3)_{0.75}(Y_2O_3)_{0.25}$, and the like.

In the case of a gas separation device, where partial pressures, rather than applied potential, are used to move ions across the electrolyte, the electrolyte may be a mixed ionic electronic conductor (MIEC). Examples of mixed ionic electronic conductors are $La_{1-x}Sr_xCoO_{3-\delta}$; ($1 \geq x \geq 0.10$)(LSC), $La_{1-x}Sr_xFeO_{3-\delta}$ ($0.8 > x > 0.1$), $SrCo_{1-x}Fe_xO_{3-\delta}$; ($0.3 \geq x \geq 0.20$), $La_{1-x}Sr_xCo_{1-y}Fe_yO_{3-\delta}$ ($0.8 \geq x \geq 0.2$, $0.8 \geq y \geq 0.2$) (LSCF); $LaNi_{0.6}Fe_{0.4}O_3$, and $Sm_{0.5}CoO_3$ (SSC).

Similarly the composition of the anode layer may depend on the end use application. In one embodiment, the anode layer comprises a material selected from the group consisting of a noble metal, a transition metal, a cermet, a ceramic, and combinations thereof. Some examples of suitable anode materials include, but are not limited to, nickel, a nickel alloy, cobalt, nickel-yttria stabilized zirconia cermet, copper-yttria stabilized zirconia cermet, nickel-ceria cermet, nickel-samaria doped ceria cermet, (nickel-gadolinium doped ceria cermet) and combinations thereof. These anode materials may be doped with many different cations. For instance, for zirconia, Y, Ca, Sc may be used as dopants, for ceria, Gd and Sm may be used as dopants. In a particular embodiment, the anode layer comprises nickel. Nickel provides the advantage of easy in-situ porosity formation, and is very robust in the green state. Other advantages of nickel relate to its relatively low cost and easy availability.

In an exemplary embodiment, a method of processing a ceramic electrolyte is provided. The method comprises: situating a ceramic electrolyte layer over an anode layer; subjecting the ceramic electrolyte layer to a stress by: exposing the electrolyte layer situated over the anode layer in a nitrogen atmosphere or an inert atmosphere or a reducing atmosphere, such that the top surface of the electrolyte is exposed to an oxidizing atmosphere and the bottom surface of the electrolyte layer to a reducing atmosphere; and heating the electrolyte layer. The ceramic electrolyte layer may be infiltrated with a liquid precursor comprising at least one oxidizable metal ion, so as to obtain an infiltrated ceramic electrolyte. The infiltrated ceramic electrolyte layer may be heated to a temperature sufficient to convert at least some of the metal ion to an oxide, thereby, significantly reducing the average size of a selected number of microcracks and hence, decreasing the permeability of the ceramic layer.

The pre-treatment of the ceramic electrolyte layer, prior to actual operation, (the step of application of stress), causes a substantial increase in the number of microcracks, or in the size of the microcracks, or in both the number of the microcracks and their size. Subsequent infiltration of the ceramic electrolyte layer with metal ions, and oxidizing them within the microcracks or pores, significantly increases the density of the ceramic electrolyte layer. Thus, the pre-initiation of the microcracks and pores may significantly mitigate or prevent further microcrack formation on subsequent heat treatment of the ceramic electrolyte layer, during the actual operation of the device. Thus the process disclosed herein is expected to provide ceramic electrolyte layers that have significantly reduced permeability, and whose performance does not significantly degrade with continuous thermal cycling.

Figure 5:
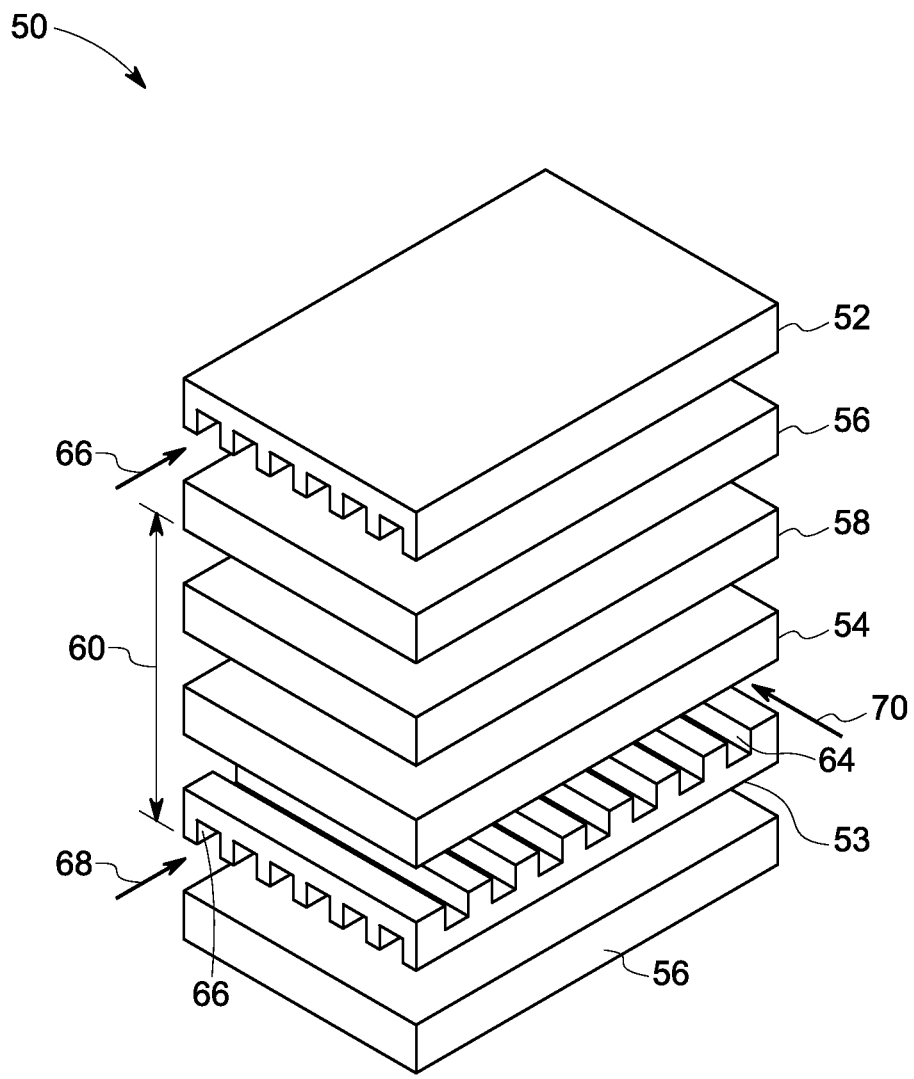
FIG. 5 is a schematic view of a solid oxide fuel cell comprising a composite ceramic electrolyte, according to one embodiment of the invention.

Another embodiment of the invention is a solid oxide fuel cell (SOFC). A fuel cell is an energy conversion device that produces electricity by electrochemically combining a fuel and an oxidant across an ionic conducting layer. As shown in FIG. 5, an exemplary planar fuel cell 50 comprises interconnect portions 52 and 53, and a pair of electrodes—a cathode 54 and an anode 56, separated by a ceramic electrolyte 58. In general, this cell arrangement is well-known in the art, although the configuration depicted in the figure may be modified, e.g., with the anode layer below the electrolyte, and the cathode layer above the electrolyte. Those skilled in the art understand that fuel cells may operate horizontally, vertically, or in any orientation.

The interconnect portion 53 defines a plurality of airflow channels 64, in intimate contact with the cathode 54, and a plurality of fuel flow channels 66 in intimate contact with the anode 56 of an adjacent cell repeat unit 60, or vice versa. During operation, a fuel flow 68 is supplied to the fuel flow channels 66. An airflow 70, typically heated air, is supplied to the airflow channels 64. Interconnects 52 and 53 may be constructed in a variety of designs, and with a variety of materials. Typically, the interconnect is made of a good electrical conductor such as a metal or a metal alloy. The interconnect desirably provides optimized contact area with the electrodes.

Figure 6:
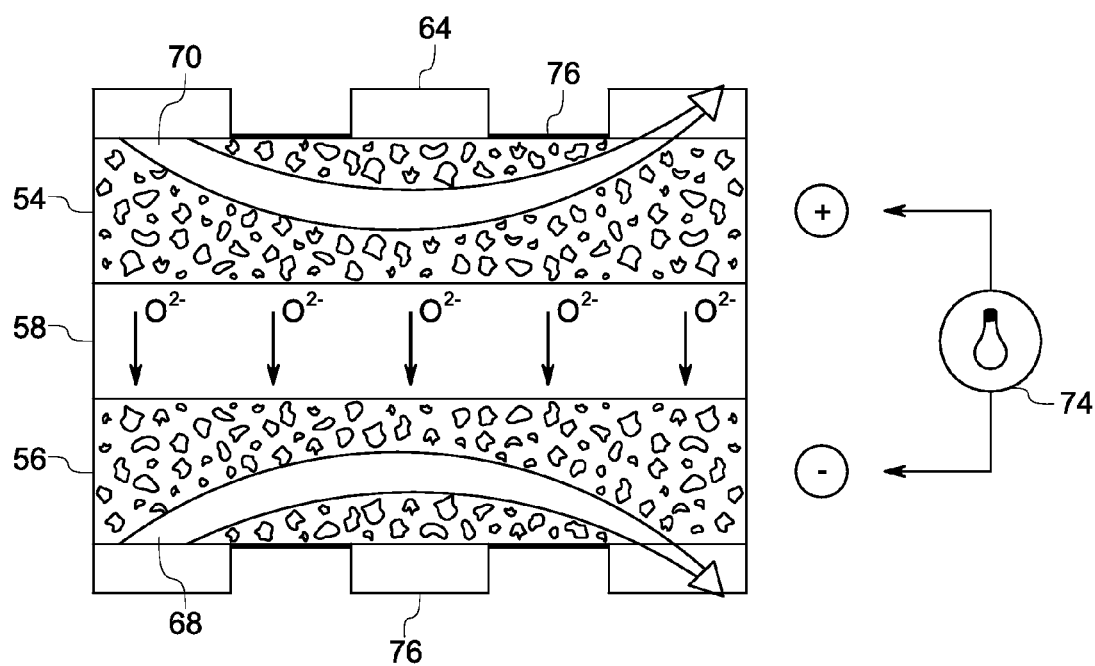
FIG. 6 illustrates an enlarged portion of an exemplary fuel cell assembly, showing the operation of the fuel cell.

FIG. 6 shows a portion of the fuel cell illustrating its operation. The fuel flow 68, for example natural gas, is fed to the anode 56, through a fuel flow channel 76 and undergoes an oxidation reaction. The fuel at the anode reacts with oxygen ions ($O^{2-}$) transported to the anode across the electrolyte. The oxygen ions ($O^{2-}$) are de-ionized to release electrons to an external electric circuit 74. The airflow 70 is fed to the cathode 54. As the cathode accepts electrons from the external electric circuit 74, a reduction reaction occurs. The electrolyte 58 conducts ions between the anode 56 and the cathode 54. The electron flow produces direct current electricity, and the process produces certain exhaust gases and heat.

In the exemplary embodiment shown in FIG. 5, the fuel cell assembly 50 comprises a plurality of repeating units 60, having a planar configuration. Multiple cells of this type may be provided in a single structure. The structure may be referred to as a "stack", an "assembly", or a collection of cells capable of producing a single voltage output.

The main purpose of the anode layer 56 is to provide reaction sites for the electrochemical oxidation of a fuel introduced into the fuel cell. In addition, the anode material is desirably stable in the fuel-reducing environment, and has adequate electronic conductivity, surface area and catalytic activity for the fuel gas reaction under operating conditions. The anode material desirably has sufficient porosity to allow gas transport to the reaction sites. The anode layer 56 may be made of any material having these properties, including but not limited to, noble metals, transition metals, cermets, ceramics and combinations thereof. Non-limiting examples of the anode layer material include nickel, nickel alloy, cobalt, Ni-YSZ cermet, Cu-YSZ cermet, Ni-Ceria cermet, or combinations thereof. In certain embodiments, the anode layer comprises a composite of more than one material.

The cathode layer 54 is typically disposed adjacent to the electrolyte 58. The main purpose of the cathode layer 54 is to provide reaction sites for the electrochemical reduction of the oxidant. Accordingly, the cathode layer 54 is desirably stable in the oxidizing environment; has sufficient electronic and ionic conductivity; has a surface area and catalytic activity for the oxidant gas reaction at the fuel cell operating conditions; and has sufficient porosity to allow gas transport to the reaction sites. The cathode layer 54 may be made of any materials meeting these properties, including, but not limited to, an electrically-conductive, and in some cases ionically-conductive, catalytic oxide such as, strontium doped $LaMnO_3$, strontium doped $PrMnO_3$, strontium doped lanthanum ferrites, strontium doped lanthanum cobaltites, strontium doped lanthanum cobaltite ferrites, strontium ferrite, $SrFeCo_{0.5}O_x$, $SrCo_{0.8}Fe_{0.2}O_{3-\delta}$; $La_{0.8}Sr_{0.2}Co_{0.8}Ni_{0.2}O_{3-\delta}$; $La_{0.7}Sr_{0.3}Fe_{0.8}Ni_{0.2}O_{3-\delta}$; and, and combinations thereof. A composite of such an electronically conductive, catalytically active material and an ionic conductor may be used. In certain embodiments, the ionic conductor comprises a material selected from the group consisting of yttria-stabilized zirconia, rare-earth-oxide-stabilized zirconia, scandia-stabilized zirconia, rare-earth doped ceria, alkaline-earth doped ceria, rare-earth oxide stabilized bismuth oxide, and various combinations of these compounds.

Typically, the electrolyte layer 58 is disposed between the cathode layer 54 and the anode layer 56. The main purpose of the electrolyte layer 58 is to conduct ions between the anode layer 56 and the cathode layer 54. The electrolyte carries ions produced at one electrode to the other electrode to balance the charge from the electron flow, and to complete the electrical circuit in the fuel cell. Additionally, the electrolyte separates the fuel from the oxidant in the fuel cell. Typically, the electrolyte 58 is substantially electrically insulating. Accordingly, the electrolyte 58 is desirably stable in both the reducing and oxidizing environments, impermeable to the reacting gases, adequately ionically conductive at the operating conditions, and compliant with the adjacent anode 56 and cathode 54. The ceramic electrolytes described for embodiments of the present invention have substantially high compliance, superior gas-tight characteristics, and good thermal cycle life. These features provide distinct advantages over conventionally deposited ceramic electrolytes.

In some embodiments of the present invention, as discussed above, the ceramic electrolyte is formed by a method comprising: situating a ceramic electrolyte layer over an anode layer; subjecting the ceramic electrolyte layer to a stress by: exposing the top surface of the electrolyte layer to an oxidizing atmosphere and the bottom surface of the electrolyte layer to a reducing atmosphere; and heating the electrolyte layer; infiltrating the ceramic electrolyte layer with a liquid precursor comprising at least one oxidizable metal ion so as to obtain an infiltrated ceramic electrolyte; and heating the infiltrated ceramic electrolyte layer to a temperature sufficient to convert at least some of the metal ion to an oxide, thereby, significantly reducing the average size of a selected number of microcracks. The stress causes a substantial increase in the number of microcracks, or in the average size of the microcracks, or in both the number of the microcracks and their average size. Subsequent infiltration of the microcracks with metal ions and oxidizing the infiltrated ions within the microcracks significantly increases the density of the layer and decreases the permeability. The ceramic electrolyte may have any suitable composition, microcrack dimension, and thickness, including those listed in the embodiments discussed previously. In a particular embodiment, the ceramic electrolyte comprises yttria-stabilized zirconia. The ceramic electrolytes disclosed herein have a gas permeability, measured in air, of less than about $8 \times 10^{-11}$ $cm^2Pa^{-1}sec^{-1}$.

The anode, cathode, and electrolyte layers are illustrated as single layers for purposes of simplicity of explanation. It should be understood, however, that the anode layer may be formed from single or multiple layers, in which the particle size can be graded through the depth of the anode. The composition of the material may also be graded, e.g., for thermal compatibility purposes.

Though the operation of the cell is explained with a simple schematic, embodiments of the present invention are not limited to this particular simple design. Various other designs—some of them complex—are also applicable, as will be appreciated by those skilled in the art. For example, in certain embodiments, the fuel cell may comprise a composite electrode-electrolyte structure, rather than a individual electrode (anode/cathode) and electrolyte layers. Such composite structures may also be incorporated with electrocatalytic materials such as $La_{1-x}Sr_xMnO_3$ (LSM), $La_{1-x}Sr_xCoO_3$ (LSC), $La_{1-x}Sr_xFeO_3$ (LSF), $La_{1-x}Sr_xCo_{1-y}Fe_yO_3$ (LSCF), $SrFeCo_{0.5}O_x$, $SrCo_{0.8}Fe_{0.2}O_{3-\delta}$; $La_{0.8}Sr_{0.2}Co_{0.8}Ni_{0.2}O_{3-\delta}$; and $La_{0.7}Sr_{0.3}Fe_{0.8}Ni_{0.2}O_{3-\delta}$, to enhance their performance.

The fuel cell may also comprise additional layers, such as buffer layers, support layers, and the like, helping to better match the coefficient of thermal expansion (CTE) of the layers. In addition, barrier layers may be included in the fuel cell, e.g., to prevent detrimental chemical reactions from occurring during operation. These layers may be in various forms, and may be prepared by various known techniques. For example, the buffer/support layers may be a porous foam or tape, or in the form of a knitted wire structure.

The embodiments of the present invention are fundamentally different from those conventionally known in the art. There have been reports of infiltrating porous ceramic layers with metal ions, and heat treating them in order to densify the ceramic layer. In such cases, the ceramic layers are not typically pre-treated to pre-initiate cracks and pores. On continuous thermal cycling, such processed electrolytes are prone to stresses due to thermal mismatch between the electrolyte layers with the adjacent layers and hence, develop fresh cracks and pores. This may lead to a significant increase in the permeability. In the present instance, the inventors have conceived a unique technique for creating additional cracks and pores within the electrolyte, and then densifying the electrolyte in order to mitigate or prevent degradation of the performance with thermal cycling.

The following examples serve to illustrate the features and advantages offered by the present invention, and are not intended to limit the invention thereto.

Example: A 10×10 cm square porous ferritic steel substrate was coated with a porous nickel oxide (NiO) air plasma sprayed (APS) anode material. A 60 micron thick yttria stabilized zirconia (8YSZ) APS electrolyte was then deposited on top of the anode coating. The permeability of the 8YSZ electrolyte coating, measured using air at room temperature, was $5.0 \times 10^{-10}$ $cm^2Pa^{-1}sec^{-1}$. The substrate/anode/electrolyte part was then heated to 800° C. and held for 4 hours. During the heat treatment, a mixture of 5% hydrogen in nitrogen was flowed over the anode side of the ferritic steel substrate, thereby reducing the NiO anode material to Ni. The cathode side of the electrolyte was exposed to air. The part was then cooled to room temperature. After heat treatment, the air permeability of the electrolyte was $6.1 \times 10^{-10}$ $cm^2Pa^{-1}sec^{-1}$, a 22% increase from the as-fabricated coating. Yttrium nitrate and zirconium dinitrate oxide aqueous precursor solutions were then prepared and mixed in the appropriate ratios to yield a 1.0 M solution with a 8YSZ final composition after nitrate decomposition. The 8YSZ nitrate solution was painted at 3.5 mg/cm² onto the 8YSZ APS electrolyte coating, and dried under vacuum. The piece was then heated briefly to 300° C., in air, to decompose the infiltrated nitrates. The 8YSZ nitrate solution infiltration and decomposition was then repeated 4 times. After the final infiltration, the part was heated to 500° C. During the 500° C. heat treatment, a mixture of 5% hydrogen in nitrogen was flowed over the anode side of the ferritic steel to prevent re-oxidation of the Ni anode. The cathode side of the electrolyte was exposed to air. After cooling to room temperature, the air permeability of the electrolyte was $1.9 \times 10^{-10}$ $cm^2Pa^{-1}sec^{-1}$. The nitrate infiltration process, followed by a 500° C. heat treatment, was repeated a total of 5 times. After the fifth cycle, the air permeability of the electrolyte was $2.0 \times 10^{-11}$ $cm^2Pa^{-1}sec^{-1}$.

While the invention has been described with reference to exemplary embodiments, it will be understood by those skilled in the art that various changes may be made, and equivalents may be substituted for elements thereof, without departing from the scope of the invention. In addition, many modifications may be made to adapt a particular situation or material to the teachings of the invention, without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for processing a ceramic electrolyte suitable for use in a fuel cell, the method comprising the steps of:
    situating a ceramic electrolyte layer over an anode layer, wherein the electrolyte layer comprises a top surface, a bottom surface, and a plurality of microcracks extending at least partially between the two surfaces, such that the bottom surface of the electrolyte layer is adjacent to the anode layer; and
    pre-treating the ceramic electrolyte layer prior to operation of the fuel cell, by subjecting the ceramic electrolyte layer to a stress sufficient to initiate microcracks in the electrolyte layer, by:
        exposing the top surface of the electrolyte layer to an oxidizing atmosphere and the bottom surface of the electrolyte layer to a reducing atmosphere; and
        heating the electrolyte layer, wherein the stress causes a substantial increase in the number of microcracks, or in the average size of the microcracks, or in both the number of microcracks and their average size;
        and then infiltrating the pre-treated ceramic electrolyte layer.

2. The method of claim 1, wherein heating comprises heating at a temperature in a range from about 650° C. to about 1000° C.

3. The method of claim 1, wherein infiltrating comprises infiltrating the pre-treated ceramic electrolyte layer with a liquid precursor comprising at least one oxidizable metal ion, so as to obtain an infiltrated ceramic electrolyte layer.

4. The method of claim 3, wherein the liquid precursor comprises at least one selected from the group consisting of an acetate, a chloride, a carbonate, and a molten nitrate material.

5. The method of claim 3, further comprising heating the infiltrated ceramic electrolyte layer to a temperature sufficient to convert at least some of the metal ion to an oxide, to significantly reduce the average size of a selected number of microcracks, and to densify the layer.

6. The method of claim 5, wherein heating comprises heating the infiltrated ceramic electrolyte layer at a temperature in the range from about 250° C. to about 800° C.

7. The method of claim 1, wherein the ceramic electrolyte comprises a material selected from the group consisting of zirconia, ceria, hafnia, bismuth oxide, lanthanum gallate, and thoria.

8. The method of claim 1, wherein the ceramic electrolyte layer comprises a material selected from the group consisting of yttria-stabilized zirconia, rare-earth-oxide-stabilized zirconia, scandia-stabilized zirconia, rare-earth doped ceria, alkaline-earth doped ceria, stabilized hafnia, rare-earth oxide stabilized bismuth oxide, and lanthanum strontium magnesium gallate.

9. The method of claim 1, wherein the ceramic electrolyte layer comprises yttria-stabilized zirconia.

10. The method of claim 1, wherein the anode layer comprises a material selected from the group consisting of a noble metal, a transition metal, a cermet, a ceramic, and combinations thereof.

11. The method of claim 10, wherein the anode layer comprises a material selected from the consisting of nickel, a nickel alloy, cobalt, nickel-yttria stabilized zirconia cermet, copper-yttria stabilized zirconia cermet, nickel-ceria cermet, and combinations thereof.

12. The method of claim 1, wherein the anode layer comprises nickel.

13. The method of claim 1, wherein situating the ceramic electrolyte layer over the anode layer comprises depositing the ceramic electrolyte layer over the anode layer.

14. The method of claim 13, wherein depositing comprises a method selected from the group consisting of thermal spraying, physical vapor deposition, electron beam physical vapor deposition, chemical vapor deposition, tape casting, screen-printing, and sol gel coating.

15. The method of claim 14, wherein thermal spraying comprises a technique selected from the group consisting of air plasma spraying, flame spraying, vacuum plasma spray, low pressure plasma spray, and detonation coating.

16. The method of claim 14, wherein the thermal spraying comprises air plasma spray.

17. The method of claim 1, wherein subjecting the ceramic electrolyte layer to a stress comprises heating the electrolyte layer situated over the anode layer in a nitrogen atmosphere, inert atmosphere, reducing atmosphere, or a mixture thereof.

18. The method of claim 17, wherein the nitrogen atmosphere comprises a nitrogen content in a range from about 1 volume percent to about 100 volume percent.

19. The method of claim 17, wherein the reducing atmosphere comprises a hydrogen content in a range from about 1 volume percent to about 100 volume percent.

20. The method of claim 1, wherein the substantial increase in the number of microcracks results in an increase by at least about 5% in permeability, as measured in air.

21. The method of claim 1, wherein the substantial increase in the average size of the microcracks comprises an increase by at least about 20% in permeability, as measured in air.

22. The method of claim 1, wherein the fuel cell comprises a solid oxide fuel cell.

23. A method for processing a ceramic electrolyte suitable for use in a fuel cell, the method comprising the steps of:
situating a ceramic electrolyte layer over an anode layer, wherein the electrolyte layer comprises a top surface, a bottom surface, and a number of microcracks extending at least partially between the two surfaces, such that the bottom surface of the electrolyte layer is adjacent to the anode layer;
pretreating the ceramic electrolyte layer prior to operation of the fuel cell, by subjecting the ceramic electrolyte layer to a stress sufficient to initiate microcracks in the electrolyte layer, by:
exposing the top surface of the electrolyte layer to an oxidizing atmosphere, and the bottom surface of the electrolyte layer to a reducing atmosphere; and
heating the electrolyte layer, wherein the stress causes a substantial increase in the number of microcracks, or in the size of the microcracks, or in both the number of the microcracks and their size;
infiltrating the pre-treated ceramic electrolyte layer with a liquid precursor comprising at least one oxidizable metal ion, so as to obtain an infiltrated ceramic electrolyte layer; and
heating the infiltrated ceramic electrolyte layer to a temperature sufficient to convert at least some of the metal ions to an oxide, thereby, significantly reducing the average size of a selected number of microcracks.

24. A solid oxide fuel cell comprising: an anode, a cathode, and a ceramic electrolyte disposed between the anode and the cathode, wherein the ceramic electrolyte is formed by a method comprising:
situating a ceramic electrolyte layer over an anode layer, wherein the electrolyte layer comprises a top surface, a bottom surface, and a number of microcracks extending at least partially between the two surfaces, such that the bottom surface of the electrolyte layer is adjacent to the anode layer;
pre-treating the ceramic electrolyte layer prior to operation of the fuel cell, by
subjecting the ceramic electrolyte layer to a stress sufficient to initiate microcracks in the electrolyte layer, by:
exposing the top surface of the ceramic electrolyte layer to an oxidizing atmosphere and the bottom surface of the electrolyte layer to a reducing atmosphere;
heating the ceramic electrolyte layer, wherein the stress causes a substantial increase in the number of microcracks, or in the average size of the microcracks, or in both the number of the microcracks and their average size;
infiltrating the ceramic electrolyte layer with a liquid precursor comprising at least one oxidizable metal ion, so as to obtain an infiltrated ceramic electrolyte layer; and
heating the infiltrated ceramic electrolyte layer to a temperature sufficient to convert at least some of the metal ions to metal oxides, thereby significantly reducing the average size of a selected number of microcracks.

25. The solid oxide fuel cell of claim 24, wherein the ceramic electrolyte comprises yttria-stabilized zirconia.

26. The solid oxide fuel cell of claim 24, wherein the ceramic electrolyte has a gas permeability, measured in air, of less than about $8 \times 10^{-11}$ $cm^2Pa^{-1}sec^{-1}$.

* * * * *